United States Patent
Okuwaki (10) Patent No.: US 7,762,706 B2
(45) Date of Patent: Jul. 27, 2010

(54) PLANAR LIGHT SOURCE

(75) Inventor: Daisaku Okuwaki, Fujiyoshida (JP)

(73) Assignee: Citizen Electronics Co., Ltd., Fujiyoshida-shi, Yamanashi-ken (JP)

( * ) Notice: Subject to any disclaimer, the term of this patent is extended or adjusted under 35 U.S.C. 154(b) by 442 days.

(21) Appl. No.: 11/865,941

(22) Filed: Oct. 2, 2007

(65) Prior Publication Data

US 2008/0025048 A1 Jan. 31, 2008

Related U.S. Application Data

(62) Division of application No. 11/057,834, filed on Feb. 15, 2005, now abandoned.

(30) Foreign Application Priority Data

Feb. 16, 2004 (JP) .............................. 2004-039076

(51) Int. Cl.
 *F21V 7/04* (2006.01)
(52) U.S. Cl. ..................... 362/625; 362/623; 362/624; 362/619; 362/620
(58) Field of Classification Search ................. 362/612, 362/613, 615, 623–625, 627–628, 618–620; 349/62, 64; 359/15, 19
See application file for complete search history.

(56) References Cited

U.S. PATENT DOCUMENTS 6,172,809 B1 * 1/2001 Koike et al. .................. 359/487
6,909,480 B2 * 6/2005 Hiraishi et al. ............... 349/112
6,991,358 B2 * 1/2006 Kokogawa .................. 362/619
7,133,019 B2 * 11/2006 Ogiwara et al. ............. 345/102

FOREIGN PATENT DOCUMENTS

| CN | 2002146589 | 11/2003 |
|---|---|---|
| JP | 10027512 | 1/1998 |
| JP | 10326515 | 12/1998 |
| JP | 11014835 | 1/1999 |
| JP | 2001155520 | 6/2001 |
| JP | 2002124114 | 4/2002 |
| JP | 2002182210 | 6/2002 |
| JP | 2003057652 | 2/2003 |
| WO | 0190637 | 11/2001 |

* cited by examiner

*Primary Examiner*—Thomas M Sember
(74) *Attorney, Agent, or Firm*—Dennison, Schultz & MacDonald (57) ABSTRACT

A planar light source has a light emitting source, and a light guide plate for receiving light beams emitted from the light emitting source at a front side thereof and changing direction of the light beams, discharging the light beams from an upper surface thereof. A first anisotropic diffusion surface is formed on a lower surface of the light guide plate, and a reflection member is provided on the first anisotropic diffusion surface. The first anisotropic diffusion surface is hologram diffusion surface or a hairline diffusion surface.

12 Claims, 10 Drawing Sheets

PLANAR LIGHT SOURCE

This application is a division of Ser. No. 11/057,834 filed Feb. 15, 2005.

BACKGROUND OF THE INVENTION

The present invention relates to a planar light source for a backlight which is, for example, provided for illuminating a liquid crystal display (LCD) panel from behind, and more particularly to a light source provided with a light guide plate, a light emitting source such as a light emitting diode (LED) disposed at a side of the light guide plate, and preferably, a light direction limiting means such as a diffusion panel disposed above the light guide plate. In such a light source, the direction of light emitted from the light emitting source is changed so that a luminous flux exits the light guide plate from the upper surface thereof, and preferably, the direction is further adjusted by the light direction limiting means.

Figure 12A:
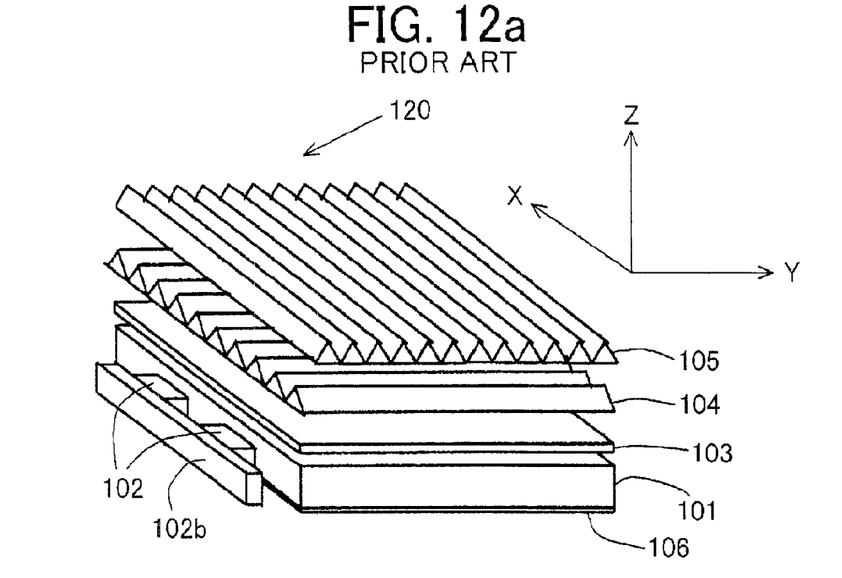
FIG. 12a is a perspective view showing a conventional light source.
Figure 12B:
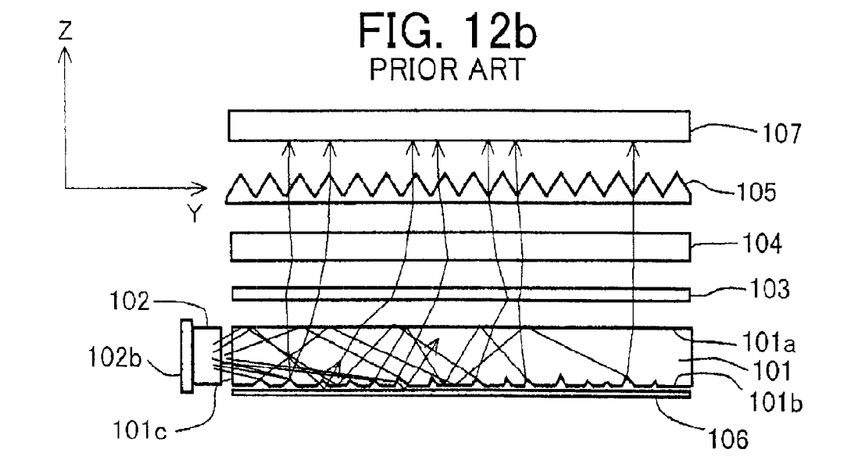

There is known a backlight unit comprising a planar light source for illuminating such a display as an LCD provided in a mobile terminal device and laptop computer. Japanese Patent Application No. 2002-146589 (Japanese Patent Application Laid-Open No. 2003-337333) discloses such a backlight unit in FIG. 17, which is shown in FIGS. 12a and 12b. FIG. 12a is a perspective view showing the backlight unit and FIG. 12b is a sectional view of the backlight unit.

A backlight unit 120 comprises a pair of LEDs (light emitting diodes) 102, a light guide plate 101, a diffusion panel 103, a Py prism sheet 104, a Px prism sheet 105, a reflection plate 106, and a transmissive or semi-transmissive LCD 107. The plates 101, 103, sheets 104, 105 are stacked.

The light guide plate 101 is made of a transparent plastic and has an upper surface 101a, lower surface 101b and front side 101c. The LEDs 102 are mounted on an LED substrate 102b and disposed opposite the front side 101c. The diffusion panel 103 is disposed above the upper surface 101a of the light guide plate 101 and the reflection plate 106 is disposed below the lower surface 101b.

The light emitted from the LEDs 102 enters the light guide plate 101 from the front side 101c. The entered light is repeatedly reflected by the upper and lower surfaces 101a and 101b and advances through the light guide plate 101. The lower surface 101b has a fine prism surface so that, in accordance with the principles of the reflection and refraction of light, a part of the light is reflected toward the upper surface 101a while the rest is refracted and enters the reflection plate 106. On the surface of the reflection plate 106, the light is reflected so as to return to the light guide plate 101. The reflection plate 106 thus serves to increase the light utility efficiency.

The direction of the discharged light is arranged in a small range by the diffusion panel 103, and further arranged by the prism sheets 104 and 105 in the Y and X-directions, and finally arranged in the Z-direction. The light arranged in the Z-direction illuminates the LCD 107. Hence the light is transmitted through the liquid crystal under an optimum condition, thereby enabling a clear display of high S/N ratio.

Figure 12C:
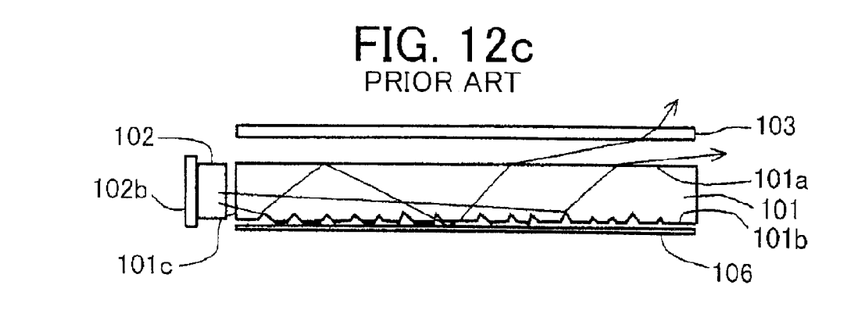

However, there is a following problem in the conventional planar light source. Namely, since the light is reflected in various directions at the lower surface 101b, not a small number of light beams enter the upper surface 101a at an angle approximate to the critical angle as shown in FIG. 12c. Such a light beam refracts at an angle approximate to 90 degrees to the normal, that is, almost horizontally. In such a case, the light beam does not enter the diffusion panel 103, or even if it does, the incident angle is so large that it is difficult to efficiently change the direction of the light beam and render it to exit from the diffusing plate 103 and enter into the Py prism sheet 104. Hence it is difficult to efficiently change the light entering the light guide plate 101 from the LED 102 into a sufficiently bright illuminating light.

Figure 13A:
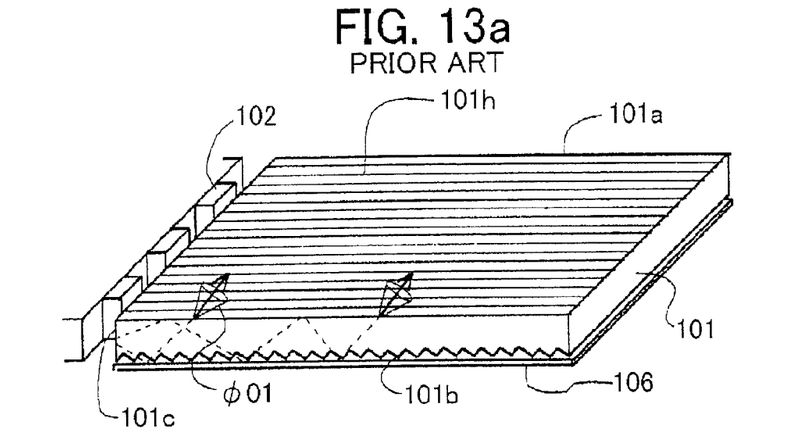
FIG. 13a is a perspective view of a light guide plate provided in another conventional light source.
Figure 13B:
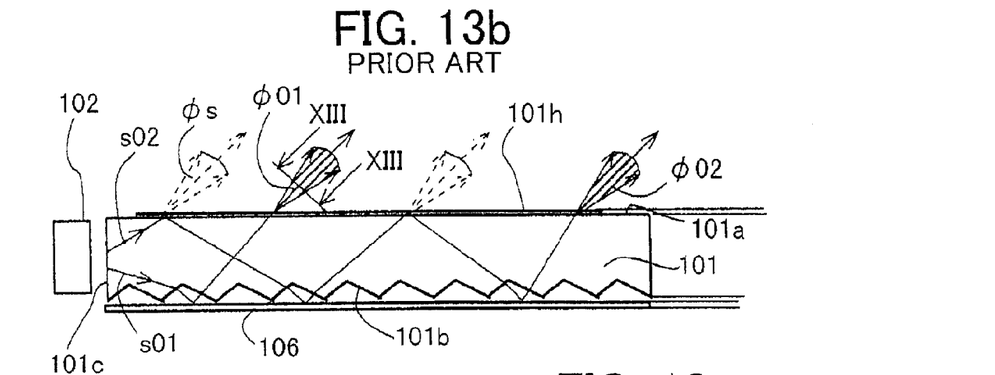
Figure 13C:
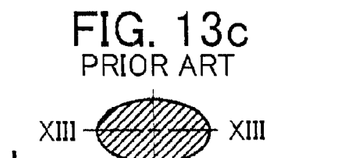
FIG. 13c shows a section of a diffused light beam taken along a line XIII-XIII of FIG. 13b.

In order to resolve the problem, there is proposed a light source shown in FIGS. 13a to 13c where the light guide plate 101 has an anisotropic diffusing surface 101h having a plurality of longitudinal hairlines or holograms provided to cause anisotropic diffusion. In the illustrated example, a plurality of hairline prisms are formed on the lower surface 101b. Other constructions of the light source are the same as that of the backlight unit 120 of FIG. 12.

The operation of the device is based on the well-known principle described on page 5 of U.S. Pat. No. 6,347,873, for example. More particularly, since the anisotropic diffusion surface 101h is formed on the upper surface 101a of the light guide plate 101a, the incident angle of the light beam applied thereto becomes a desired angle larger than 90 degrees, far from the horizontal direction. Hence, a tapered diffracted light beam φ01 is generated even in the case where the incident angle of the incident light beam is approximate to the critical angle. Thus the incident angle of the light beams entering the diffusion panel 103 is increased so that the light utility efficiency is improved and the brightness of the illuminating light is increased.

Meanwhile, the diffused light beam φ01 is an anisotropically diffused light beam having a longer axis in the longitudinal direction of the anisotropic diffusion surface 101h than in the lateral direction as shown by the section thereof in FIG. 13c. The diffusion surface 101h is thus adapted to have a large diffusion characteristic in the longitudinal direction thereof. The reason the anisotropic diffusion surface is so adapted is that although the diffusion caused by each of the numerous grooves overlaps each other in the lateral direction of the surface 101h so that the light is sufficiently laterally diffused, in the longitudinal direction, it is necessary to render the diffusion at each groove wider in the longitudinal direction than in the lateral direction.

Figure 13D:
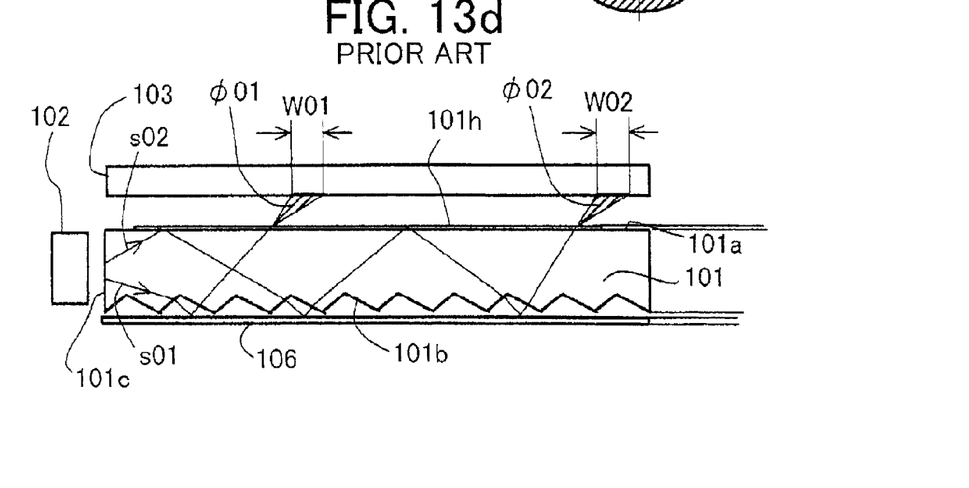
FIG. 13d is an illustration explaining the operation of the light guide plate.

However, there is another problem even in the thus improved planar light source when examined more closely. Referring to FIGS. 13b and 13d which are enlarged diagrams showing the part adjacent the front side 101c of the light guide plate 101, a light beam s01 reflected at the lower surface 101b and a light s02 reflected at the upper surface 101a are examined. The light beam s01 is refracted at the prism of the lower surface 101b and further reflected by the reflection plate 106 so as to again reach the lower surface 101b. The beam is refracted and enters the diffusion surface 101h of the upper surface 101a at an incident angle approximate to the critical angle but smaller. Accordingly, the beam exits the diffusion surface 101h as a diffused light beam φ01 at an angle within a predetermined range without reflecting. Since the upper surface 101a is not smooth, the beam does not exit horizontally.

On the other hand, supposing the initial incident angle of the light beam s02 is larger than the critical angle, the beam enters the diffusion surface 101h. Contrary to the case where the upper surface 101a is smooth so that the incident light is 100 percent totally reflected, due to the diffusion, a quite a large part of the light exits as a secondary diffused light beam φs as shown by the dotted lines in FIG. 13b. The rest of the light beam is reflected and permeated through the lower surface 101b, reflected at the reflection plate 106, refracted at, the lower surface 101b and reaches the upper diffusion surface 101h. Due to the operation of the prism at the lower surface 101b, the incident angle at the diffusion surface 101h is gradually reduced each time the beam is reflected. In the example shown in the figure, in the light beam s02, after going through the reflection twice, the incident angle at the diffusion surface 101h becomes smaller than the critical angle so that only a diffused light beam φ02 is emitted. Since the intensity of the diffused light beam φ02 decreases by that of the secondary light beam φs every time the beam is reflected, the intensity of the diffused light beam φ02 becomes smaller than that of the diffused light beam φ01.

In addition, as shown in FIG. 13d, the diffused light beams φ01 and φ02 are able to enter the diffusion panel 103 in ranges having widths W01 and W02, respectively. Since the distance between the light guide plates 101 and the diffusion panel 103 cannot be increased, it is impossible to enlarge the widths W01 and W02.

More particularly, as explained with regard to the light beams φ01 and φ02, regarding a single internal light beam, although diffused at the diffusing surface 101 h, the widths W01 or W02 of the range through which thee beam reaches the diffusion panel 103 is small. In order to increase the range, it is necessary to let the light beams enter the diffusion surface 101h at various incident angles so that the position of exit of the beams φ01 and φ02 vary. As the position is moved toward the right in the drawing, the number of reflections at the diffusion surface 101h increases, which results in decrease in intensity of the light beam. Hence the luminance of the output light is decreased as the distance from the front surface 101c increases toward the right side of the light guide plate in FIG. 13b. Consequently, the intensity of incident light entering the diffusion panel 103 also decreases at the right side so that the distribution of luminance becomes uneven. The light transmitted through the diffusion panel 103 is adjusted in X-, Y-, and Z-directions by the Py prim sheet 104 and Px prism sheet 105 and becomes the illuminating light. However, the illuminating light also becomes uneven in luminance.

Namely, in the planar light source provided with the anisotropic diffusion surface on the upper surface of the light guide plate, the intensity of light which exits the diffusion surface becomes lower toward the right, that is, as the distance from the LED increases. As a result, the luminance of the light exiting the light guide plate and entering an optical path adjusting means such as the diffusion panel becomes uneven depending on the position. Such a tendency is retained even in light entering the LCD 107 after passing through the optical path adjusting means so that the quality of illumination is decreased.

SUMMARY OF THE INVENTION

An object of the present invention is to provide a planar light source wherein the luminance of the illuminating light is large and even.

According to the present invention, there is provided a planar light source comprising a light emitting source, a light guide plate for receiving light beams emitted from the light emitting source at a front side thereof and changing direction of the light beams, discharging the light beams from an upper surface thereof, a first anisotropic diffusion surface formed on a lower surface of the light guide plate, and a reflection member provided to face the lower surface of the light guide plate on which the first anisotropic diffusion surface is formed.

The reflection member is provided for reflecting the light beams emitted from the first anisotropic diffusion surface to return the light beams to the first anisotropic diffusion surface to form anisotropic diffused light beams which are increased in sectional area by two diffusion, The first anisotropic diffusion surface is a hologram diffusion surface or a hairline diffusion surface.

A plurality of prisms are formed on the upper surface of the light guide plate.

The angle between the upper surface and the front side of the light guide plate is 90 degrees, and the thickness of the light guide plate is gradually reduced toward a rear side, and the first anisotropic diffusion surface is formed on the lower surface.

In another aspect of the present invention, a second anisotropic diffusion surface is formed on a part of the upper surface of the light guide plate and the first anisotropic diffusion surface comprises two kinds of anisotropic diffusion surfaces which are different from each other in characteristic of diffusion, and further comprises a diffusion plate and light direction correcting means provided on the light guide plate.

The light direction correcting means comprises a Px prism sheet having X-direction prisms and Py prism sheet having Y-direction prisms.

These and other objects and features of the present invention will become more apparent from the following detailed description with reference to the accompanying drawings.

BRIEF DESCRIPTION OF DRAWINGS

FIG. 1b is an illustration showing a light guide plate provided in the light source of FIG. 1a;

FIG. 2 is a perspective view of a light guide plate provided in the planar light source of FIG. 1a;

FIG. 7b shows a section of a diffused light beam shown in FIG. 7a;

FIGS. 12b and 12c are illustrations explaining the operation of the light source of FIG. 12a;

FIG. 13b is an illustration explaining the operation of the light guide plate of FIG. 13a;

DETAILED DESCRIPTION OF THE PREFERRED EMBODIMENT

A principle of the anisotropic diffusion by holograms and hairlines will be described hereinafter.

Figure 7A:
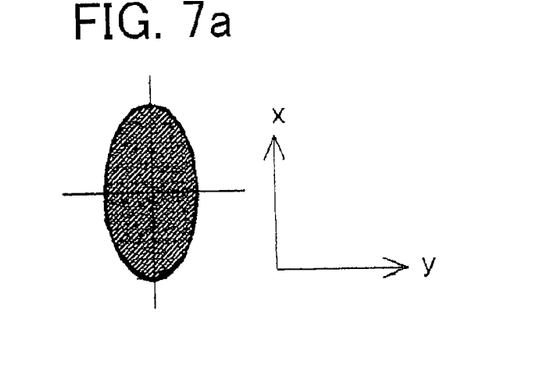
FIG. 7a is a diagram schematically explaining an anisotropic diffusion in the present invention.
Figure 7B:
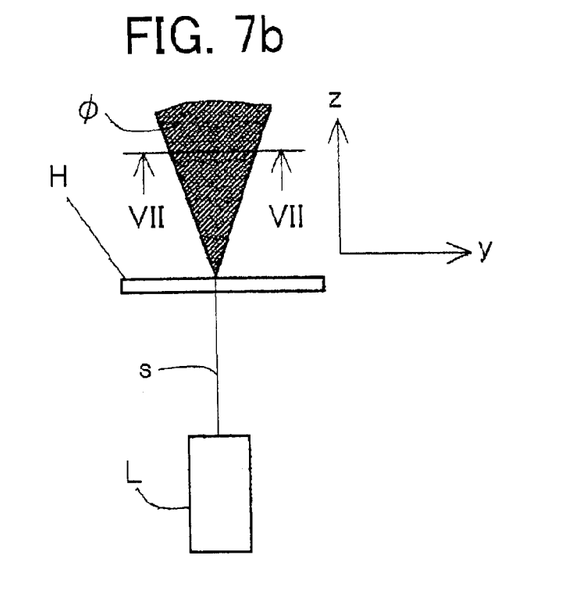
Figure 7C:
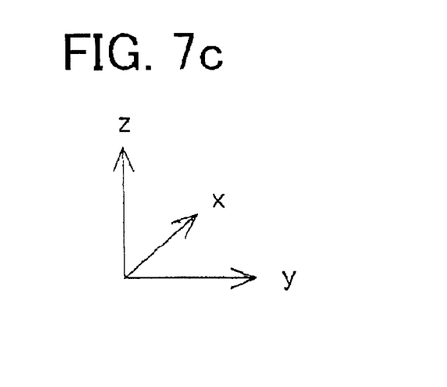
FIG. 7c shows orthogonal coordinates of X-, Y- and Z-directions.

FIGS. 7a to 7c are diagrams conceptually explaining the anisotropic diffusion. Referring to FIG. 7b, when a coherent light beam s from a laser light emitting source L enters an anisotropic diffusion surface H in a perpendicular direction with respect to the X-Y plane illustrated in FIG. 7c, a diffused light beam $\phi$ is generated. As shown in FIG. 7a which shows a section of the beam taken along a line VII-VII of FIG. 7b, the beam is anisotropic in shape in that the beam has a long axis in the X-direction and a short axis in the Y-direction. Namely, the diffused light $\phi$ is an anisotropic diffused light diffused more in the X-direction than in Y-direction.

An example of a hologram for producing such an anisotropically diffused light beam is described. A hologram records phase information of standing waves which are generated when an object beam and a reference beam interfere with each other. Accordingly, upon entrance of a reference beam, the hologram reproduces a diffracted light beam as an object beam.

Figure 8A:
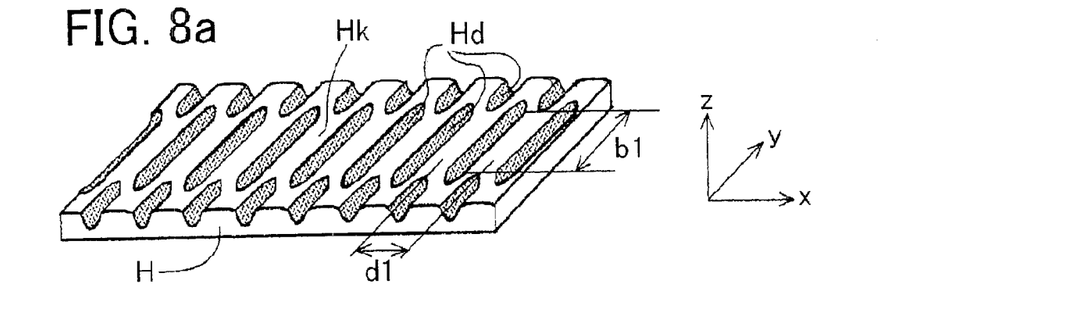
FIG. 8a to 8e are diagrams explaining the principle of the anisotropic diffusion caused by a hologram.

There is a type of a hologram called "surface relief hologram" where the phase information of the coherence light is recorded not in tones, but by bumps or pits formed by using photoresist on a surface of the hologram. FIG. 8a shows a portion of the surface relief hologram for generating an anisotropically diffused light beam as an object beam.

Referring to FIG. 8a, a hologram H has a plurality of pits Hd formed on a surface thereof thereby forming substantially flat portion Hk between the pits. Each of the pits Hd is elongated in the Y-direction and aligned in parallel in the X-direction. In the drawing, b1 is a distance between the adjacent pits Hd in the Y-direction and d1 is a distance between the centerlines of the adjacent pits Hd in X-direction.

Figure 8B:
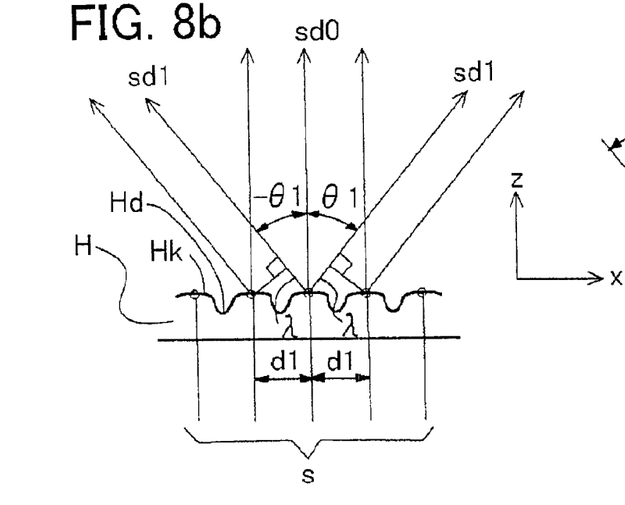
Figure 8C:
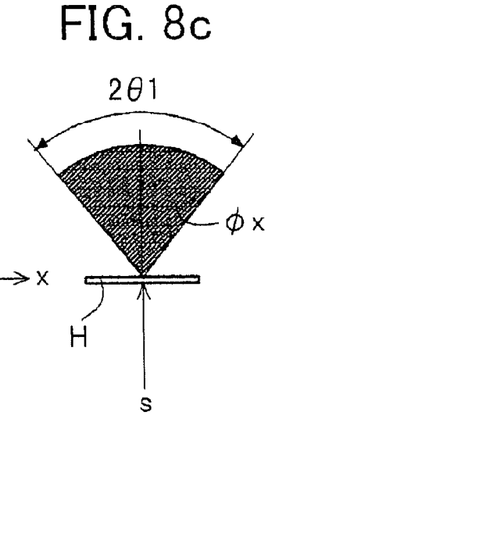

As shown in FIG. 8b, in the X-Z plane, when coherent incident light beams s perpendicularly enter the surface of the hologram H which is in the X-Y plane, namely, in the direction Z at an incident angle of zero degrees, some of the beams reach the pits Hd while the other reach the flat portion Hk. The light reaching the pits Hd are diffusely reflected so that hardly any of the light is transmitted through the hologram H. On the other hand, each of the light beams reaching the flat portion Hk becomes a point source so as to generate an elementary wave. Accordingly, a diffracted light beam is generated in a direction strengthening the elementary waves. A zeroth order diffracted light beam sd0 of the diffracted light beam is transmitted in the same direction as the incident light s so that the output angle of the incident light s is zero degrees. On the other hand, as shown in FIG. 8b, there is a relationship between the output angle $\theta 1$ of a first order diffracted light beam sd1 and the distance d as described below.

$$\sin \theta 1 = \pm \lambda/d1 \qquad (1)$$

wherein $\lambda$ is a wavelength of the incident light beam s. It can be seen from the equation (1) that the output angle $\theta 1$ can be set between zero degrees and $\pm 90$ degrees by determining the distance d1 between the pits. As shown in FIG. 8c where the diffusion shown in FIG. 8b is enlarged, a single incident light beam s is diffused in the X-Z plane by the hologram H as a diffusing surface so as to become a sector shaped diffused light beam $\phi$x having an angular width of 2$\theta$1. In the case where the angular width becomes smaller than 2$\theta$1, the light can be sufficiently diffused by varying the distance d1 between the pits as appropriate.

Figure 8D:
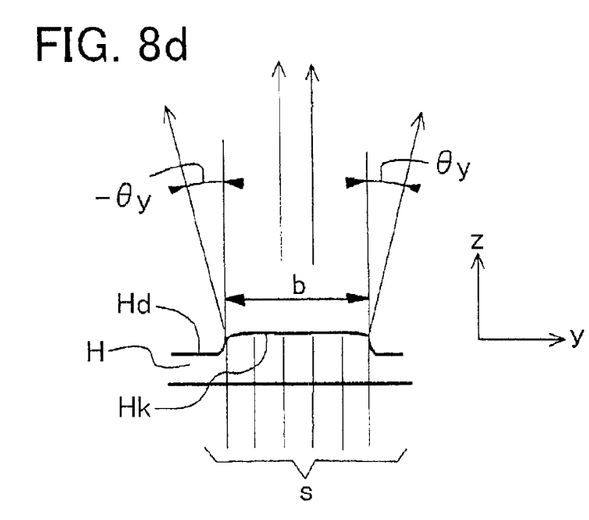

Referring to FIG. 8d, in the Y-Z plane, when the incident light beams s perpendicularly enter the surface of the hologram H, the beams passing though the flat portion Hk at the center with regard to the direction Y between adjacent pits Hd advance straight whereas the beams at the end portions are diffracted in Y-direction only at a diffraction angle $\theta$y. The value of the diffraction angle $\theta$y depends on the wavelength $\lambda$ and the distance b1 as follows.

$$\sin \theta y = \pm \lambda/b1 \qquad (2)$$

Figure 8E:
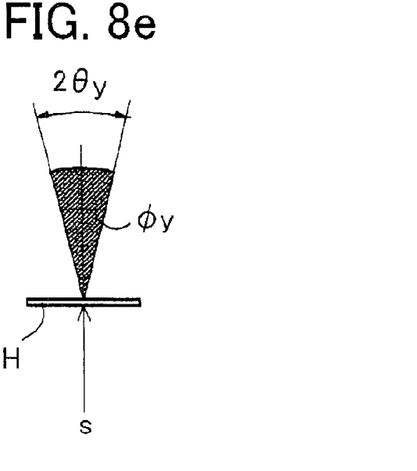

Comparing the equations (1) with (2), it can be understood that if the distance b1 between the pits is sufficiently larger than the distance d1, the diffraction angle $\theta$y can be sufficiently smaller than the output angle $\theta 1$. As shown in FIG. 8e where the diffusion shown in FIG. 8d is enlarged, a single incident light beam s is diffused by the hologram H so that a sector shaped diffused light beam $\phi$y having an angular width of 2$\theta$y is generated in the X-Z plane.

The angular width 2$\theta$1 of the diffused light in the X-Z plane shown in FIG. 8c is much larger than an angular width 2$\theta$y in the Y-Z plane in FIG. 8e. Accordingly, the hologram H provides diffused light beams the angular widths of which differ depending on the direction of the sectional plane. Hence the hologram H can be said as having an anisotropic. diffusion surface. The hologram H is hereafter referred to as an anisotropic diffusion surface H.

An example of the anisotropic diffusion where the anisotropic diffusion surface H is formed on a light guide plate in actual practice is described hereinafter with reference to FIGS. 9a to 9d.

Figure 9A:
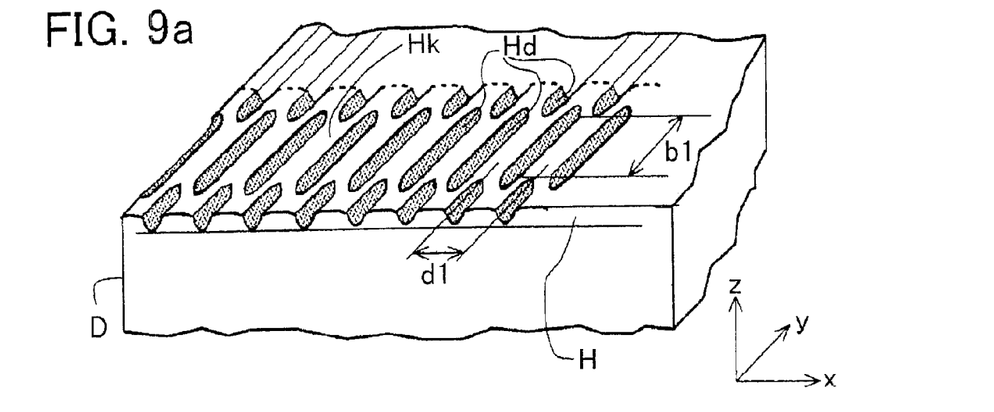
FIGS. 9a to 9d are diagrams explaining the operation of the anisotropic diffusion caused by a hologram provided on a surface of a light guide plate of the present invention.

Referring to FIG. 9a, the anisotropic diffusion surface H having a phase hologram of a surface relief type shown in FIG. 8a is formed on a light guide plate D. The pits and flat portions on the anisotropic diffusion surface H are formed by photoresist to represent tone of coherent light which corresponds to phase information. In order to form the pits and flat portions, a metal mold on which the shape of the diffusion surface is transferred is produced by plating and the metal mold is incorporated in a mold for manufacturing the light guide plate by injection molding.

Figure 9B:
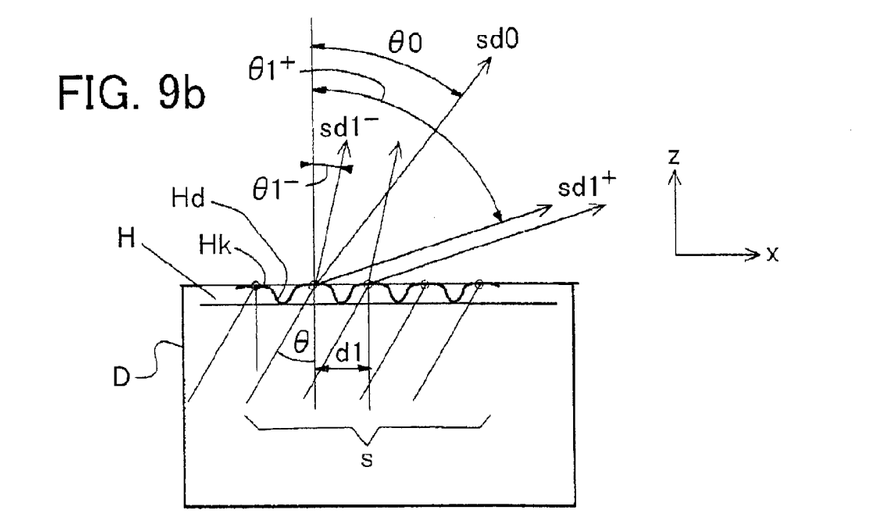

Referring to FIG. 9b, in the plane X-Z, when the incident light beams s enter the anisotropic diffusion surface H at an incident angle $\theta$, the beam at each flat portion Hk becomes a point source so as to generate an elementary wave, thereby forming diffracted light in a direction strengthening the elementary waves. With regard to a zeroth order diffracted light beam sd0, $$\sin \theta 0 = n \sin \theta \qquad (3)$$

wherein $\theta 0$ is an output angle of the zeroth order diffracted beam light sd0 and n is the refractive index of the light guide plate D. With regard to the first order diffracted light began sd1, $$\sin \theta 1 = n \sin \theta \pm (\lambda/d1) = \sin \theta 0 \pm (\lambda/d1) \qquad (4)$$

As shown by the equation (3), Snell's law is applied in the case of zeroth order diffracted light beam. As shown by the equation (4), the incident angle $\theta 1$ of the first order diffracted light beam varies within a range about the incident angle $\theta 0$ of the zeroth order diffracted light beam so that, as shown in FIG. 9b, diffracted light beams sd1⁻ and sd1⁺ are generated. In the case where distance d1 is so small that $\lambda/d1 > 2$, $$|\sin\theta 0 \pm (\lambda/d1)| > 1$$

Hence the equation (4) cannot be satisfied. Accordingly, the zeroth order diffracted light beam sd0 exists but not the first order diffracted light beam sd1. Namely, if the distance d1 between the point sources is small, the light is diffracted only in accordance with the Snell's law as in the case of smooth surface and diffusion does not occur. Hence a distance of several times as that of the wavelength $\lambda$ is generally selected as the distance d1 between the pits Hd.

Figure 9C:
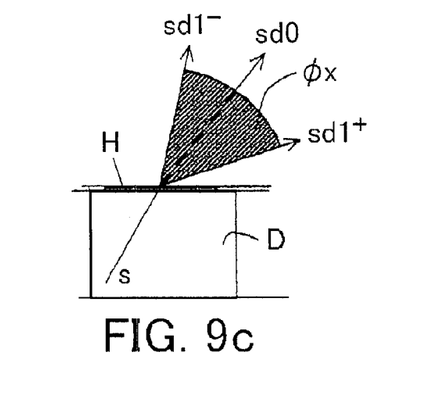

As shown in FIG. 9c where the diffusion shown in FIG. 9b is enlarged, a single incident light beam s is diffused in the X-Z plane by the anisotropic diffusion surface H so as to become a sector shaped diffused light beam φx which spread out between the first order diffracted light beams sd1⁺ and sd1⁻ with the zeroth order diffracted light beams sd0 at the center. The diffraction in the Z-Y plane is the same as that in FIG. 8e. Thus in the present example, an anisotropic diffusion can be realized by forming the anisotropic diffusion surface H with a hologram on the surface by flat portions and pits which corresponds to the phase information of the coherent light.

Figure 9D:
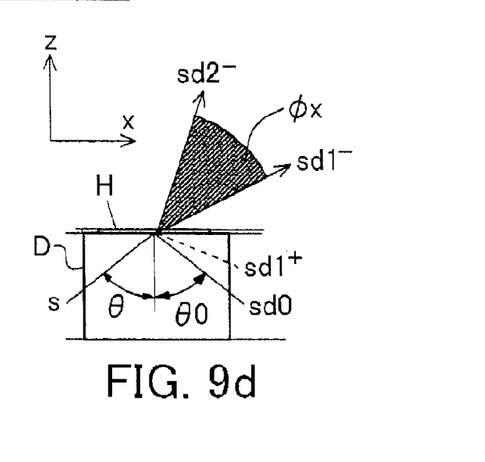

When the incident angle θ of the incident light beam entering the anisotropic diffusion surface H exceeds the critical angle as shown in FIG. 9d, the zeroth order diffracted light beam sd0 is reflected at an output angle which is equal to the reflection angle θ0 at total reflection. There is also generated a first order diffracted light as beams sd1⁺ and sd1⁻ in accordance with the Snell's law and a second order diffracted light beam s2⁻ although equation thereof is not shown here. The light beams sd1⁻ and s2⁻ are transmitted through the anisotropic diffusion surface H and exit out as the diffused light beam φx. Thus incident light is not 100 percent totally reflected even when the incident angle θ exceeds the critical angle but a part of the incident light is reflected while the remaining part is diffused out of the light guide plate as the secondary diffused light beam φs shown in FIG. 13b.

Figure 10A:
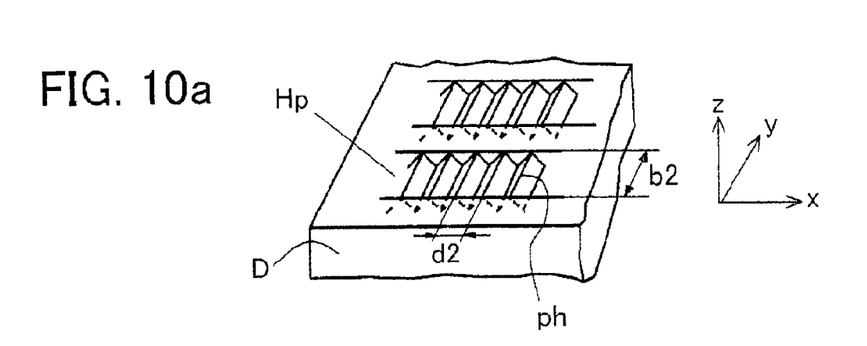
FIGS. 10a to 10d are diagrams explaining the operation of the anisotropic diffusion by minuscule prisms provided on a surface of a light guide plate of the present invention.
Figures 10B, 10C:
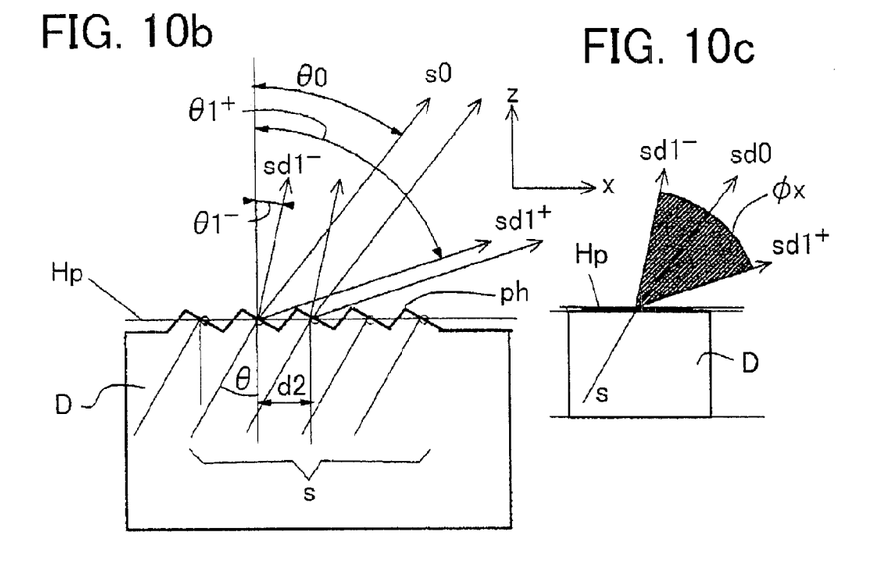

FIGS. 10a to 10d show another example of the anisotropic diffusion where the light guide plate D has an anisotropic diffusion surface Hp on which a plurality of miniscule prisms ph arranged in hairlines in the X-direction are formed. A distance d2 between the adjacent prisms ph and a length b2 of each prism are about the same as the distance d1 and the distance b1 between the pits, respectively, on the anisotropic diffusion surface H in FIG. 9a. When incident light beams s enter the hairline diffusion surface Hp at an incident angle θ, each beam reaching the inclined surface of the prism ph becomes a point source so as to produce an elementary wave, thereby forming diffracted light in a direction strengthening the elementary waves. With regard to the incident angle of the zeroth order diffracted light beam sd0, the afore mentioned equation (3) is satisfied, and with regard to the incident angle of the first order diffracted light beam sd1, the equation (4) is satisfied. Namely, if the distance between the miniscule prisms are on the order of several times as that of the wavelength $\lambda$, the anisotropic diffusion will occur in the same manner as with the anisotropic diffusion surface H having a diffraction grating shown in FIG. 9a regardless of the inclination of the prisms. Thus the diffused light beams φx is generated as shown in FIG. 10c.

Figure 10D:
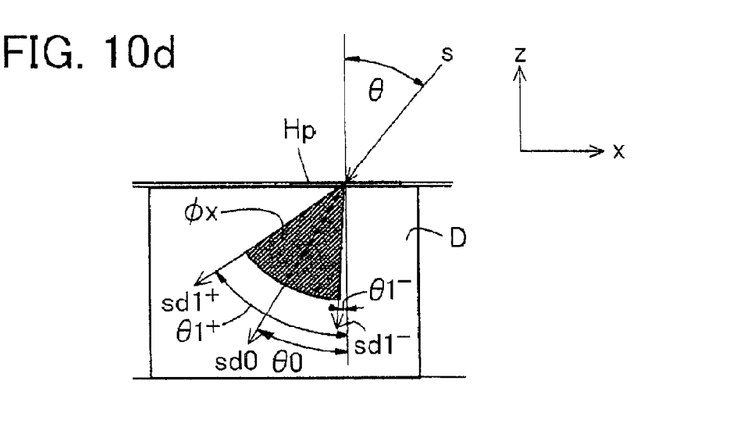

Referring to FIG. 10d, when the incident light beam s enters the anisotropic diffusion surface Hp formed on the light guide plate D from ambient atmosphere at an incident angle θ, the zeroth order diffracted light beam sd0 and the first order diffracted light beam sd1 are diffused within the light guide plate D. In accordance with the Snell's law, there is the following relationship between the incident angle θ and the output angle θ0.

$$\sin\theta 0 = (\sin\theta)/n \quad (5)$$

The relationship between the first order diffracted light beam sd1 and the output angle θ1 is, $$\sin\theta 1 = [\sin\theta \pm (\lambda/d2)]/n = \sin\theta 0 \pm (\lambda/nd2) \quad (6)$$

Namely, as shown in FIG. 10d, if the light beam s enters the opposite side of the light guide plate D from the ambient atmosphere, there is produced a sector shaped light beam φx in the X-Z plane where the first order diffraction light spread out between beams sd1⁺ and sd1⁻. Thus the anisotropically diffused light is generated as in the case shown in FIG. 10c.

Figures 11A, 11B:
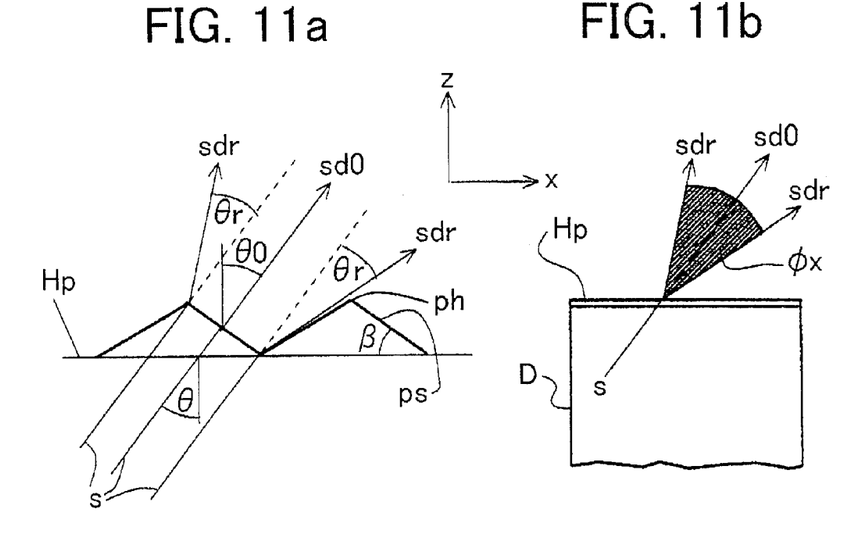
FIGS. 11a to 11d are diagrams explaining the operation of the anisotropic diffusion by small prisms provided on a surface of a light guide plate of the present invention.
Figure 11C:
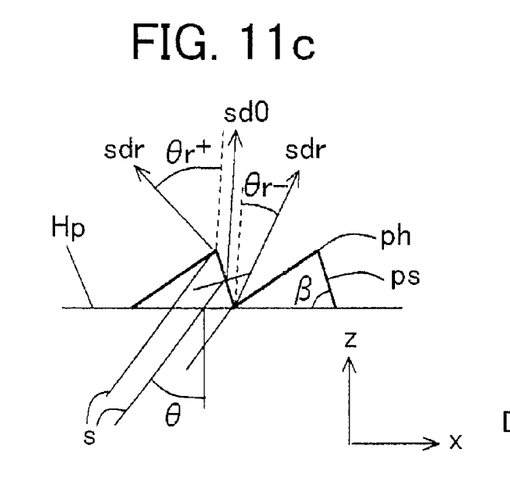
Figure 11D:
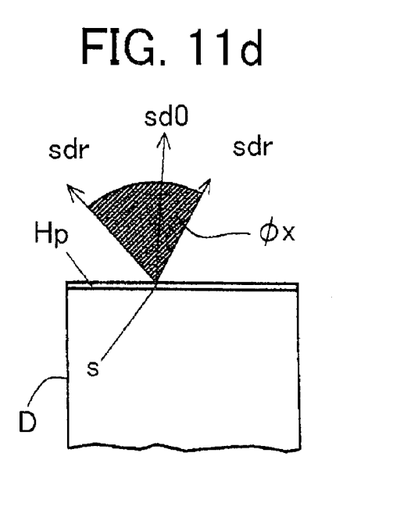

FIGS. 11a to 11d show another example of the light guide plate D having the anisotropic diffusion surface Hp having hairline prisms ph. In the example, the distance d2 between the prisms ph is considerably larger than the wavelength $\lambda$ of the light beams. In accordance with the equation (4), the output angle θ1 of the first order diffracted light beam caused by the interference of the light beams exiting the adjacent prisms ph is substantially equal to the output angle θ0 of the first order diffracted light beam so that the first order diffracted light beam sd1 is considered as not to exist. Regarding the output angle θ0 of the zeroth order diffracted light beam sd0, the Snell's law is established not with regard to the hairline anisotropic diffusion surface Hp but with regard to an inclined surface ps of the prism ph. The same can be said for ordinary large prisms. However, in the case of prisms of middle size between the large and miniscule prisms, there occurs diffusion at a diffraction angle θr at the end portions of the inclined surface ps as shown in FIGS. 11a and 11c. The diffraction angle θr has the same characteristics as the diffraction angle θy in the equation (2) and decreases as the length of the inclined surface ps is increased. As shown in FIG. 11a, an inclination angle β of the inclined surface ps is equal to the incident angle θ and the incident light beam s enters the inclined surface ps perpendicularly. Thus the incident angle θ is equal to the output angle θ0 of the zeroth order diffracted light beam sd0. Accordingly, diffracted light beams sdr each diffracted at the angle θr are generated about the diffracted light beam sd0. The diffracted light beams sd0 and sdr form a diffused light beam φx having a sector shape when enlarged as shown in FIG. 11b is thus generated When the inclination angle β of the prism is increased as shown in FIG. 11c, the direction of the zeroth order diffracted light beam sd0 is bent to the left by the refraction so as to become approximately perpendicular to the hairline anisotropic diffusion surface Hp and the diffracted light beams sdr which are diffracted at only diffraction angle θr are diffused about the zeroth order diffracted light beam sd0, thereby forming a sector shaped diffused light φx when enlarged in FIG. 11d. Thus, the diffusion range is enlarged to the left side diverged from the extension of the incident light beam s.

Although it has been explained in the above description with regard to FIGS. 11a to 11d that the extent of the diffusion depends on the diffraction angle θr, by setting the angle β of the inclined surface ps of the prism ph at various angles, the output angle θ0 of the zeroth order diffraction light sd0 can be varied. Accordingly, the angular width of the emitted light can be increased even though the diffraction angle θr may be small.

The anisotropic diffusion surface used in the present invention need not be limited to surfaces having holograms and hairlines but may include other surfaces capable of causing anisotropic diffusion such as those having shades or uneven surface in a shape of a plurality of ellipses, parabola, and curves such as hyperbola.

Figure 1A:
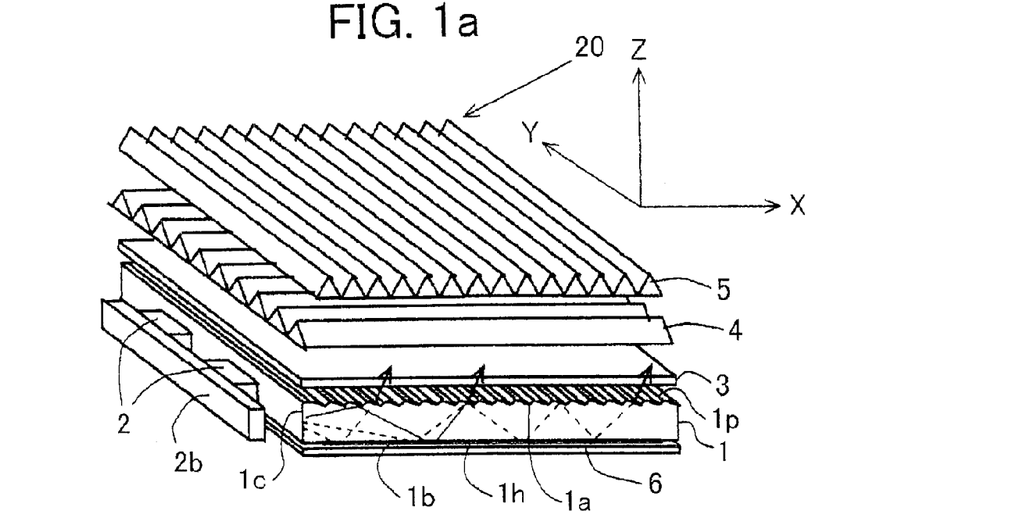
FIG. 1a is a perspective view showing a planar light source according to a first embodiment of the present invention.
Figure 1B:
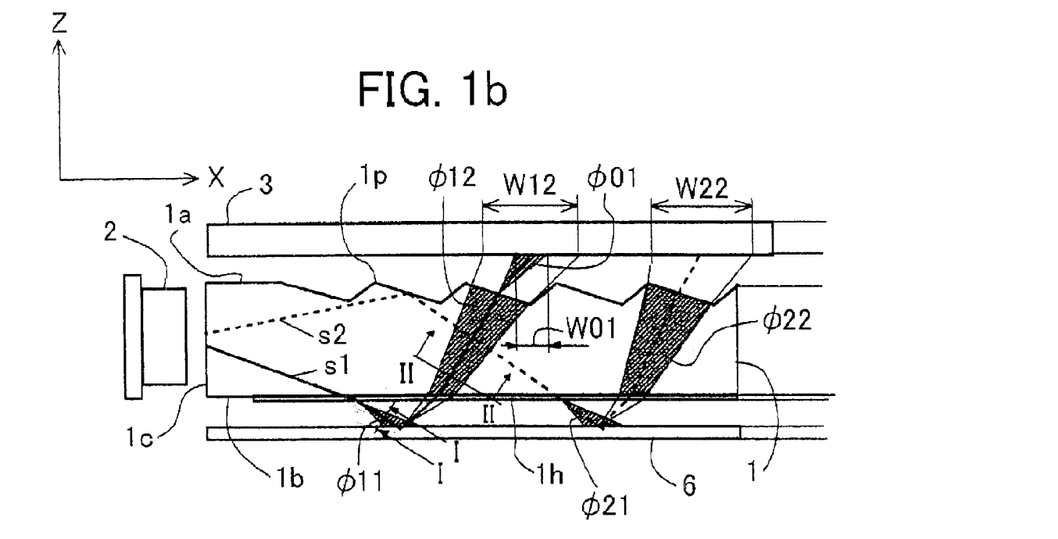
Figure 1C:
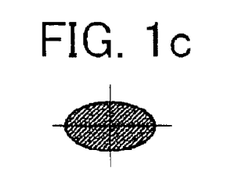
FIGS. 1c and 1d show sections of diffused light beams taken along lines I-I and II-II of FIG. 1b, respectively.
Figure 1D:
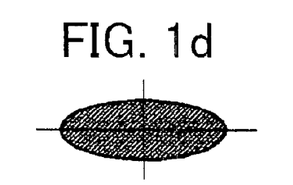
Figure 2:
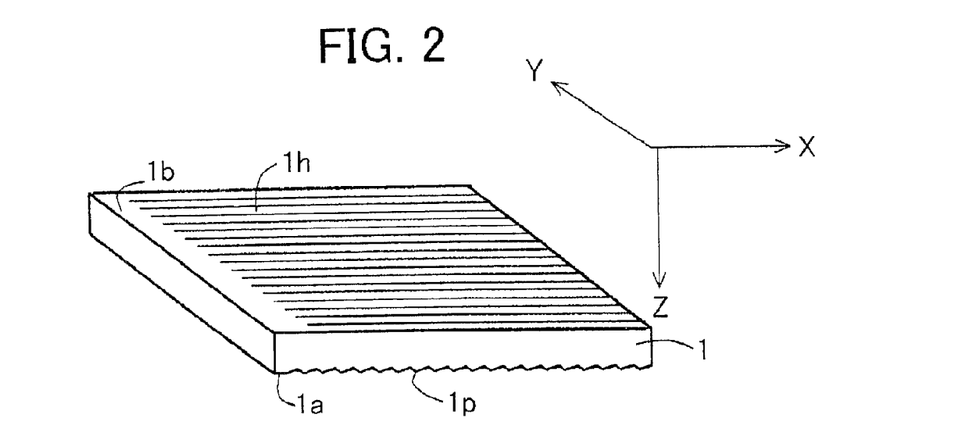
Figure 3:
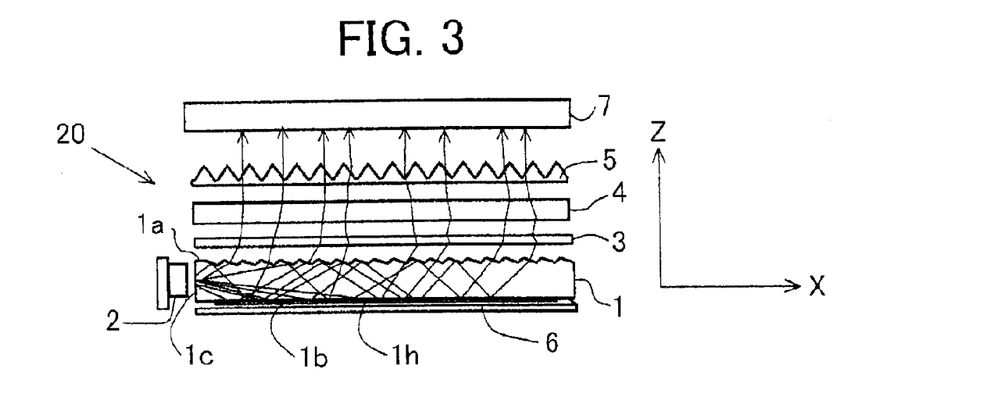
FIG. 3 is a sectional view of the planar light source explaining the operation thereof.

The first embodiment of a planar light source of the present invention is described hereinafter with reference to FIGS. 1a to 1d, FIG. 2, and FIG. 3. FIG. 1a is a perspective view showing the entire light source, FIG. 1b is an illustration, showing the operation of a light guide plate provided in the light source, FIGS. 1c and 1d are diagrams describing the operation of the planar light source, FIG. 2 is a perspective view of a light guide plate provided in the light source, and FIG. 3 is a sectional view of the planar light source explaining the illuminating operation thereof.

Referring to FIG. 1a, a planar light source 20 comprises a pair of LEDs 2, a light guide plate 1, a diffusion panel 3, a Py prism sheet 4, a Px prism sheet 5, and a reflection plate 6. The reflection plate 6, light guide plate 1, diffusion plate 3, prism sheets 4 and 5 are stacked.

The light guide plate 1 is made of a transparent plastic and has an upper surface 1a, lower surface 1b and front side 1c. The LEDs 2 are mounted on an LED substrate 2b and disposed opposite the front side 1c. A plurality of prisms 1p are formed on the upper surface 1a. Each prism 1p has a polished mirrored surface. As shown in FIG. 2, which shows the light guide plate as seen from the underside thereof, the light guide plate 1 has, on the underside thereof, a hologram diffusion surface or a plurality of fine hairline grooves such as those shown in FIG. 10a so as to form an, anisotropic diffusion surface 1h on the lower surface 1b.

The diffusion panel 3 is disposed above the upper surface 1a of the light guide plate 1 and the reflection plate 6 is disposed to face the lower surface 1b of the light guide plate on which the anisotropic diffusion surface 1h is formed.

The light emitted from the LEDs 2 enters the light guide plate 1 from the front side 1c. The entered light is repeatedly reflected by the prisms 1p on the upper surface 1a and the anisotropic diffusion surface 1h on the lower surface 1b, and as shown in FIG. 1a, exits the light guide plate 1 through various paths.

Optical paths of some light beams selected from the various incident light beams emitted from the LED are described as a representative example with reference to FIG. 1b which shows the planar light source 20 in detail. Of the incident light beams applied to the light guide plate 1, a light beam s1 which is applied to the anisotropic diffusion surface 1h formed on the lower surface 1b and a light beam s2 which is applied to the prism surface 1p formed on upper surface 1a are examined. The light beam s1 is diffused at a diffusion angle determined by the miniscule structure of the anisotropic diffusion surface 1h so as to emit a diffused light beam $\phi 11$. The diffused light beam $\phi 11$ is reflected at the reflection plate 6 and again enters the anisotropic diffusion surface 1h. The diffused light beam $\phi 11$ is further diffused so that a diffused light beam $\phi 12$ is emitted and enters into the light guide plate 1. FIG. 1c shows a section of the diffused light beam $\phi 11$ taken along a line I-I of FIG. 1b and FIG. 1d shows a section of the diffused light beam $\phi 12$ taken along a line II-II of FIG. 1b. It can be seen from FIGS. 1c and 1d that the anisotropic property is more enhanced in the re-diffused light beam $\phi 12$ than in the first diffused light beam $\phi 11$.

By repeating the diffusion twice, the anisotropic property, that is, the tendency to diffuse in the direction of the hairlines, is enhanced. When seen in the X-Z plane, the width of the finally diffused light beam $\phi 12$ is increased in the course of the optical path length from the lower surface 1b to the prism 1p. The light beam $\phi 12$ is refracted by and transmitted through the prism 1p so as to enter the diffusion panel 3 at a width W12 as shown in FIG. 1b. The incident width W12 is much larger than the width W01 of the diffused light beam $\phi 01$ entering the diffusion panel of the conventional planar light device 101 shown in FIG. 13c. In FIG. 1b, a light beam $\phi 01$ and the width W01 of the conventional device are shown only as a comparison and not as the operation of the present embodiment.

On the other hand, the light bean s2 enters the prism 1p on the upper surface 1a and is totally reflected. The reflected light enters the anisotropic diffusion surface 1h at the lower surface 1b without losing any light intensity and then becomes a diffused light beam $\phi 21$. The diffused light beam $\phi 21$ is reflected at the reflection plate 6 and re-enters the diffusion surface 1h. The diffused light beam $\phi 21$ is further diffused to become a diffused light beam $\phi 22$ which is led inside the light guide plate 1. The diffused light beam $\phi 22$ is refracted at the prism 1p on the upper surface, exits the surface and enters the diffusion panel 3. The diffused light beam is increased in width during the course of the optical path length so that the beam $\phi 22$ enters the diffusion panel in a range of a sufficiently large width W22. Unlike the light beam s02 entering the upper surface in the conventional device shown in FIG. 13b, since the flat surface of the prism 1p allows the total reflection the intensity of the light beam s2 reflected at the upper surface 1a is not reduced. Accordingly, the diffused light beam $\phi 22$ having a sufficient luminance permeates the upper surface 1a and enters the diffusion panel 3. Although not illustrated in the drawing, in the case of a beam which is reflected several times at the upper surface 1a and reaches the upper surface 1a approximate the right end of the light guide plate 1, the luminance is not weakened through the reflections so that a flux of light having sufficient luminance is refracted by the prism surface, transmitted through the surface and directed toward the diffusion panel 3.

Accordingly, in the present embodiment, the light can be emitted in a wide range at incident widths larger than in the conventional device without causing decrease in intensity. The light beams uniform in luminance enter into the diffusion panel 3 at a predetermined angular width, and are thereafter transmitted through the diffusion panel 3, Px prism sheet 4, Py prism sheet 5 in order, so that the beams efficiently changes the directions to become an illuminating light in Z or vertical direction without losing the intensities thereof. Accordingly, the light can illuminate the transmissive or semi-transmissive LCD 7 shown in FIG. 3 with high and even luminance.

Figure 4:
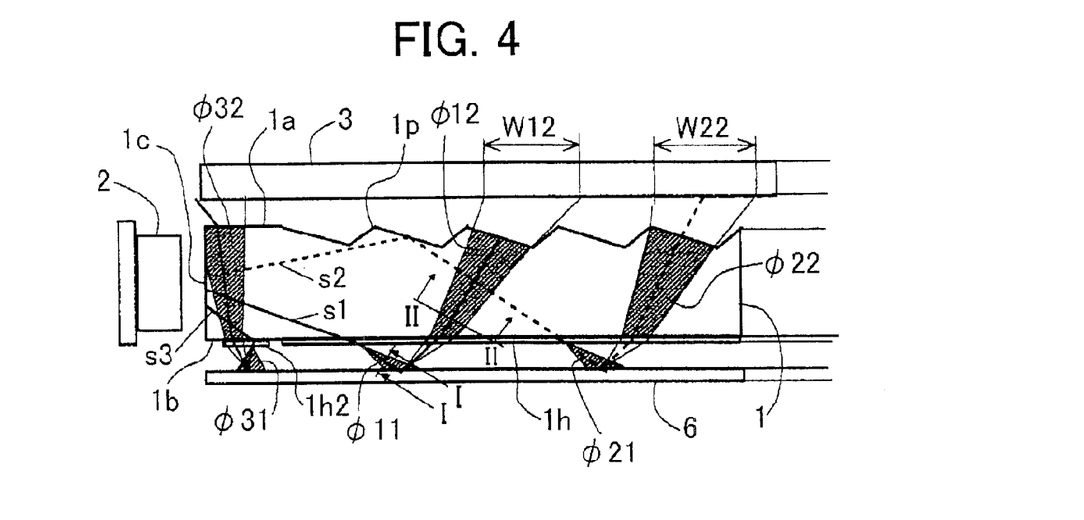
FIG. 4 is an illustration showing a part of a light source according to a second embodiment of the present invention.

The second embodiment of the planar light source of the present invention is described hereinafter with reference to FIG. 4 showing the light guide plate 1 in detail. On the lower surface 1b of the light guide plate 1, in addition to the anisotropic diffusion surface 1h, there is formed a second anisotropic diffusion surface 1h2 adjacent the front side 1c. The characteristic of the anisotropic diffusion surface 1h2 differs from that of the anisotropic diffusion surface 1h in that the directions toward which the diffused beams are emitted differ. Namely, the second anisotropic diffusion surface 1h2 has a miniscule structure shown in FIG. 11c, for example. A light beam s3 entering the front side 1c and exiting the light guide plate 1 from second anisotropic diffusion surface 1h2 is diffused in both sides of the normal of the anisotropic diffusion surface 1h2 and become a diffused light beam $\phi 31$. The diffused light beam $\phi 31$ is applied to the reflection plate 6, reflected, again permeates the second anisotropic diffusion surface 1h2 and reaches the light guide plate 1 as a diffused light beam $\phi 32$. The light beam $\phi 32$ is refracted at the upper surface 1a of the light guide plate 1 and enters the diffusion panel 3. Since the diffused light beam $\phi 32$ enters the light guide plate 1 at a position close to the front side 1c at the left side of the light guide plate, the refracted light beam sufficiently covers the left edge area of the diffusion panel 3. The other constructions and operation are the same as those of the first embodiment shown in FIGS. 1a through 1d.

In accordance with the second embodiment, the light beams, the output angles of which are limited within a desired angle, enter the entire area of the diffusion panel 3 so that the luminance of the illuminating light emitted from the planar light source is improved while maintaining the level of brightness.

Figure 5:
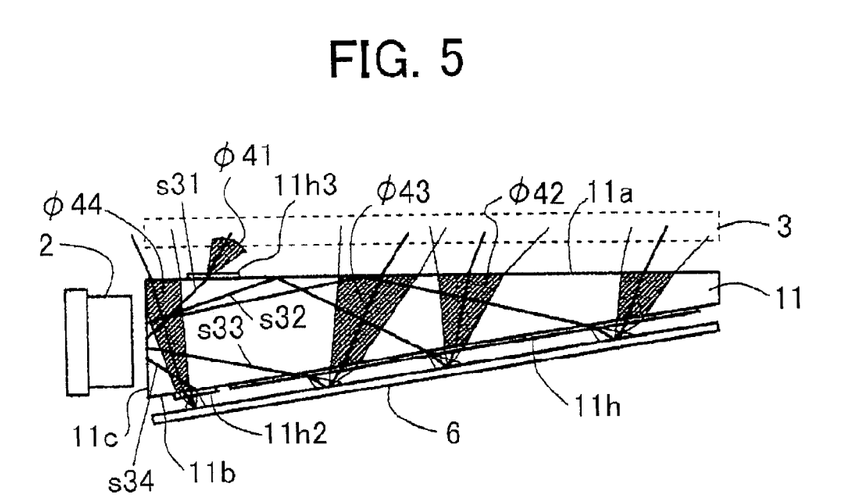
FIG. 5 is an illustration showing a part of a light source according to a third embodiment of the present invention.

Referring to FIG. 5, showing the third embodiment of the present invention, a light guide plate 11 has a flat horizontal upper surface 11a and a lower surface 11b inclining upward as the distance from a front side 11c increases. The lower surface 11b has a first anisotropic diffusion surface 11h and a second anisotropic diffusion surface 11h2 adjacent the front side 11c having the same characteristics as the second anisotropic diffusion surface 1h2 of the second embodiment. A third anisotropic diffusion surface 11h3 is formed on the upper surface 11a at an appropriate position adjacent the front side 1c. The third anisotropic diffusion surface 11h3 has the same characteristics as the anisotropic diffusion surface 11h.

In operation, of the light beams emitted from the LED 2, one of the light beams, a light beam s31, is directly applied to the third anisotropic diffusion surface 11h3 so that a diffused light beam φ41 within a, predetermined angle range exits the upper surface 11a of the light guide plate 11. On the other hand, another beam s32 which strikes the upper surface 11a at the right side portion of the third anisotropic diffusion surface 11h3 is totally reflected so as to advance downward and enters the first anisotropic diffusion surface 11h. The beam is diffused and enters the reflection plate 6, reflected and re-enters the anisotropic diffusion surface 11h. As a result, a diffused light beam φ42 is emitted and refracted by the upper surface 1a and enters the diffusion panel 3 at a large width.

Another light beam s33 reaches the anisotropic diffusion surface 11h on the lower surface 1b and is diffused and reflected at the reflection plate 6 to produce a diffused light beam φ43. The diffused light beam φ43 is refracted at the upper surface 1a, thereby entering the diffusion panel 3 at a wide width.

Although the light beam s32 is subjected to a total reflection at the upper surface 1a before becoming the diffused light beam φ42, since the intensity of the light is not reduced by the total reflection, the same intensity as that of the diffused light beam φ43 which had not undergone the total reflection is maintained.

In the case of another light beam s34 which is directly applied to the second anisotropic diffusion surface 11h2 on the lower surface 11b, a diffused light beam φ44 is diffused at a portion adjacent a front surface 11c in accordance with the principle described in the second embodiment with regard to the second anisotropic diffusion surface 1h2. The diffused light beam φ44 is refracted at the upper surface 11a so as to sufficiently cover the left side portion of the diffusion panel 3. Thus, the diffused light enters a wide area of the diffusion panel 3. Accordingly, the light source of the present embodiment also emits uniform and bright illuminating light.

Figure 6:
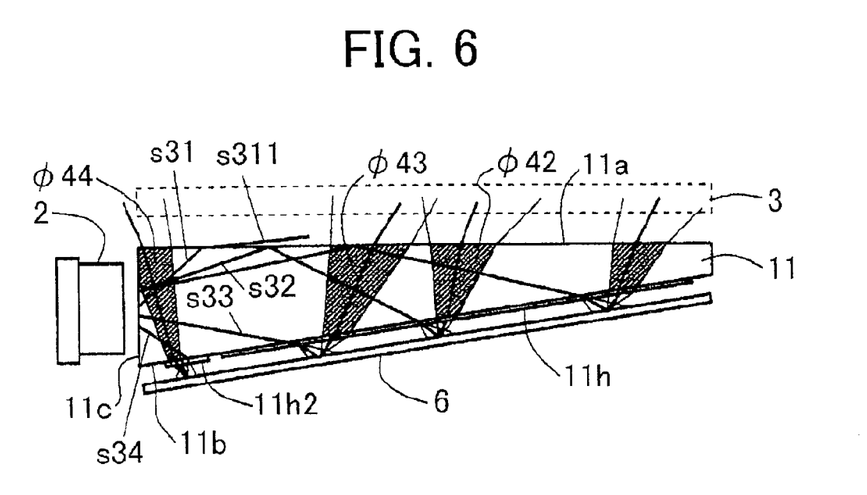
FIG. 6 is an illustration showing a part of a light source according to a fourth embodiment of the present invention.

The fourth embodiment of the present invention shown in FIG. 6 is similar to the third embodiment shown in FIG. 5 except that the third anisotropic diffusion surface 11h3 is omitted in the fourth embodiment. When the incident light beam s31 enters the upper surface 11a at an approximate but smaller angle than the critical angle, the light beam s31 is refracted and emitted as an output light beam s311 at an output angle of about 90 degrees. Hence the light utility efficiency at the diffusion panel 3 is reduced. The third embodiment prevents such a problem. However, since there is only a few internal light beams under such a condition, a similar effect as that of the third embodiment is obtained even in the light source of FIG. 6 without the third anisotropic diffusion surface. Thus the fourth embodiment also provides a planar light source which emits a bright and even illuminating light.

In accordance with the present invention, the anisotropic diffusion surface such as those formed by hairlines and holograms is provided not on the upper surface but on the lower surface of the light guide plate, and the reflecting means such as the reflection plate is provided opposite the anisotropic diffusion surface. Accordingly, the following effects are obtained.

(1) The light beam which is emitted from the light emitting source such as LED and led into the light guide plate and to the lower surface thereof is diffused by the anisotropic diffusion surface at a predetermined angle, reflected by the reflecting means, and re-diffused at the anisotropic diffusion surface. Since the diffusion occurs twice interposing a reflection at the reflecting means, the anisotropic property of the beam is enhanced. Due to the two diffusions and increase in optical path length, the range of the beam reaching the upper surface of the light guide plate is increased.

(2) Most of the light beams which renter the upper surface of the light guide plate directly, or through reflection at the lower surface, are, due to the total reflection, applied to the anisotropic diffusion surface on the lower surface, and go through diffusion, reflection and re-diffusion as the light-beams described above. These light beams reach another large area of the upper surface diverged from the above described area while maintaining sufficient intensity of light.

(3) Thus, the light beams enter substantially the entire area of the upper surface of the light guide plate at a desired incident angle by the use of anisotropic diffusion surface. Thereafter, the beams are refracted and emitted upward.

As a result, when the output light beams from the light guide plate are controlled to vertically advance using diffusion panel and other optical path adjusting means, the light utility efficiency is increased. Hence a light source enabling to emit illuminating light which is bright and even in luminance is provided.

While the invention has been described in conjunction with preferred specific embodiment thereof, it will be understood that this description is intended to illustrate and not limit the scope of the invention, which is defined by the following claims.

What is claimed is:

1. A planar light source comprising:
   a light emitting source;
   a light guide plate provided with a front side for receiving light beams emitted from the light emitting source, an upper surface for discharging the light beams and a lower surface facing the upper surface;
   a reflection member provided to face the lower surface of the light guide plate;
   a first anisotropic diffusion surface disposed on the lower surface of the light guide plate at a position removed from the front side of the light guide plate; and
   a second anisotropic diffusion surface having minuscule prisms and disposed on the lower surface of the light guide plate at a position adjacent to the front side of the light guide plate, the first anisotropic diffusion surface and the second anisotropic diffusion surface being different in characteristics.

2. The planar light source according to claim 1 wherein the first anisotropic diffusion surface is a hologram diffusion surface.

3. The planar light source according to claim 1 wherein the first anisotropic diffusion surface is a hairline diffusion surface.

4. The planar light source according to claim 1 wherein a plurality of prisms are formed on the upper surface of the light guide plate.

5. The planar light source according to claim 1 further comprising a diffusion plate and light direction correcting means provided on the light guide plate.

6. The planar light source according to claim 5 wherein the light direction correcting means comprises a Px prism sheet having X-direction prisms and a Py prism sheet having Y-direction prisms.

7. The planar light source according to claim 1 further comprising a diffusion plate and light direction correcting means provided on the light guide plate.

8. The planar light source according to claim 1 further comprising a third anisotropic diffusion surface.

9. The planar light source according to claim 8 wherein the third anisotropic diffusion surface is disposed on the upper surface of the light guide plate.

10. The planar light source according to claim 9 wherein the first anisotropic diffusion surface and the third diffusion surface are same in characteristics.

11. The planar light source according to claim 9 wherein the third anisotropic diffusion surface is disposed on the upper surface at a position adjacent to the front surface of the light guide plate.

12. The planar light source according to claim 9 wherein the angle between the upper surface and the front side of the light guide plate is 90 degrees, and the thickness of the light guide plate is gradually reduced toward a rear side facing the front side.

* * * * *